(12) United States Patent
O'Connell et al.

(10) Patent No.: US 6,517,429 B1
(45) Date of Patent: Feb. 11, 2003

(54) CONTAMINATION FREEING WORK ARRANGEMENT

(75) Inventors: Keiron O'Connell, Jefferson, KY (US);
James C. Wolfe, Floyd, KY (US);
Daniel X. Josephs, Jefferson, KY (US)

(73) Assignee: AAF McQuay, Inc., Louisville, KY (US)

( * ) Notice: Subject to any disclaimer, the term of this patent is extended or adjusted under 35 U.S.C. 154(b) by 0 days.

(21) Appl. No.: 10/050,270

(22) Filed: Jan. 16, 2002

(51) Int. Cl.[7] .............................................. B08B 15/02
(52) U.S. Cl. .......................................... 454/56; 55/212
(58) Field of Search ............................. 454/49, 56, 57, 454/66, 67; 55/212

(56) References Cited

U.S. PATENT DOCUMENTS

| | | | |
|---|---|---|---|
| 2,067,434 A | * | 1/1937 | Charipar ...................... 96/399 |
| 3,301,167 A | * | 1/1967 | Howard et al. ............... 454/60 |
| 3,880,361 A | | 4/1975 | Hensiek et al. ............... 98/115 |
| 3,895,570 A | * | 7/1975 | Eagleson, Jr. ................ 454/57 |
| 4,102,656 A | * | 7/1978 | Koritz ......................... 96/222 |
| 4,987,882 A | | 1/1991 | Kaufman .................... 126/229 |
| 5,665,128 A | | 9/1997 | Peters et al. ................. 55/212 |
| 5,711,705 A | | 1/1998 | Krainak et al. ............... 454/57 |
| 6,010,400 A | | 1/2000 | Krainak et al. ............. 454/187 |
| 6,176,368 B1 | | 1/2001 | Bradbury et al. ........ 198/860.5 |
| 6,254,653 B1 | | 7/2001 | Choi et al. .................... 55/497 |

OTHER PUBLICATIONS

Ppgs 13.5–13.7, "1999 ASHRAE Applications Handbook" B10.

* cited by examiner

*Primary Examiner*—Derek Boles
(74) *Attorney, Agent, or Firm*—Polster, Lieder, Woodruff & Lucchesi

(57) ABSTRACT

An arrangement for treating a work object including a unique, unified method and apparatus for contaminant removal from the work object, wherein a laminar flow, ambient air stream passes through connected zones at lower pressure than ambient with particulate matter being filtered from the air stream.

21 Claims, 6 Drawing Sheets

US 6,517,429 B1

CONTAMINATION FREEING WORK ARRANGEMENT

BACKGROUND OF THE INVENTION

The present invention relates to an apparatus and method for removing contaminant materials from an air stream to be filtered and more particularly to a unique and novel arrangement for isolating a worker from direct contact with an object to be worked upon while contaminant particles from the work object are carried through a filtration area during work treating operations.

Contamination-freeing work stations have been long known in the filtration art, attention being directed to U.S. Pat. No. 3,880,061, issued to C. K. Hensick et al on Apr. 29, 1975, wherein an air stream is moved in an endless loop over a work surface with entrained contaminants being removed from the air stream. Attention is further directed to the grease collecting arrangement of U.S. Pat. No. 4,987,882, issued to A. S. Kaufman on Jan. 29, 1991; to the clean air cabinet of U.S. Pat. No. 5,665,128, issued to M. D. Peters et al on Sep. 9, 1997; to the comparatively complex down flow, isolation work station with the upstream and downstream looped circuit, filtration arrangement in U.S. Pat. No. 5,711, 705, issued to R. E. Kraniek, et al on Jan. 27, 1998 and U.S. Pat. No. 6,010, 400, issued to R. E. Krainiak et al on Jan. 4, 2000; and, to the duel control high pressure to low pressure dust settling arrangement of U.S. Pat. No. 6,176,368 B1, issued to S. A. Bradbury et al on Jan. 23, 2001.

For the most part, the past known arrangements have been comparatively complex in construction, assembly and maintenance, often requiring a downdraft or rear-entry table which creates air currents resulting in low pressure areas with particulate matter being swept into an ambient user breathing zone.

The present invention provides a unique and novel unified arrangement wherein a worker positioned in an ambient area is isolated from a work area, insuring air pressure within such work area lower than ambient air pressures to prevent "back flow" into such isolated user breathing zones.

In accordance with the present invention, ambient air is caused to enter into a work station in the form of a low pressure laminar air stream and to exit through a high efficiency filtration arrangement and an air moving system which is located downstream of the filtration system. In addition, the present invention provides a unique and novel arrangement for accommodating detritus materials, which might otherwise accumulate in the work area and block particulate filtration during working operations.

Although the unified present invention has particular utility as a mail shelter to minimize the danger of airborne contamination, it can find a myriad of other uses where it would be desirable to work on an object in an area isolated from a worker who would be positioned in surrounding ambient space.

Upon reading the disclosure herein, it will be readily understood that the apparatus and method of the present invention is comparatively straightforward and economical in manufacture, assembly and usage, allowing ready apparatus portability, ready filter assembly, and requiring a minimum of space and parts, along with a minimum of operating steps in carrying out the unified novel method set forth herein.

Various other features of the present unified invention will become obvious to one skilled in the art upon reading the disclosure herein.

BRIEF SUMMARY OF THE INVENTION

More particularly, the present invention provides a contamination freeing work structure positionable in ambient surroundings comprising: a first isolation chamber providing a work station therein sized to supportingly accommodate a work object to be handled by a worker positioned in ambient surroundings, the first chamber including a cover wall with a portion thereof being translucent and a portion thereof being movably attached to the cover wall to allow introduction of the work object into the work station chamber and to be subsequently closed therearound to be visible to the worker positioned in the ambient surroundings, the first chamber further including ambient air inlets to allow ambient air to pass therethrough and working port means having flexible glove means sealingly attached thereto to extend into the first chamber to permit such worker to handle the work object indirectly in sealed relation therefrom; a second chamber communicably connected downstream the first chamber, the second chamber having a flow-through particulate filter removably disposed therein; and, a third chamber connected to the second chamber, the third chamber including a blower and a clean air outlet connected to ambient for moving air through the first and second chambers maintaining said upstream chamber pressures below ambient pressure, filtering the air as it passes through the particulate filter in the second chamber to the clean air outlet in the third chamber. The present invention further provides a fourth chamber communicating with the first chamber to readily receive detritus material therefrom.

In addition, the present invention provides a unique and novel method of treating an isolated work supported object within ambient surroundings having sufficient space to accommodate at least one worker comprising: introducing the work object into a first enclosed slotted work supporting zone positioned in ambient surroundings, the first zone including means for an isolated worker to view and manipulate the work supported object in such first zone without direct contact and connected to a second filtration zone and a third air moving zone; and, actuating the air moving zone to draw air through the zones to provide air pressure in at least said first and second zones below ambient pressure surroundings.

It is to be understood that various changes can be made by one skilled in the art in one or more of the several parts and several steps of the present invention without departing from the scope or spirit of the unified invention disclosed herein.

DESCRIPTION OF THE DRAWINGS

Referring to the drawings which disclose one advantageous embodiment of the present invention.

DETAILED DESCRIPTION OF THE DRAWINGS

Figure 3:
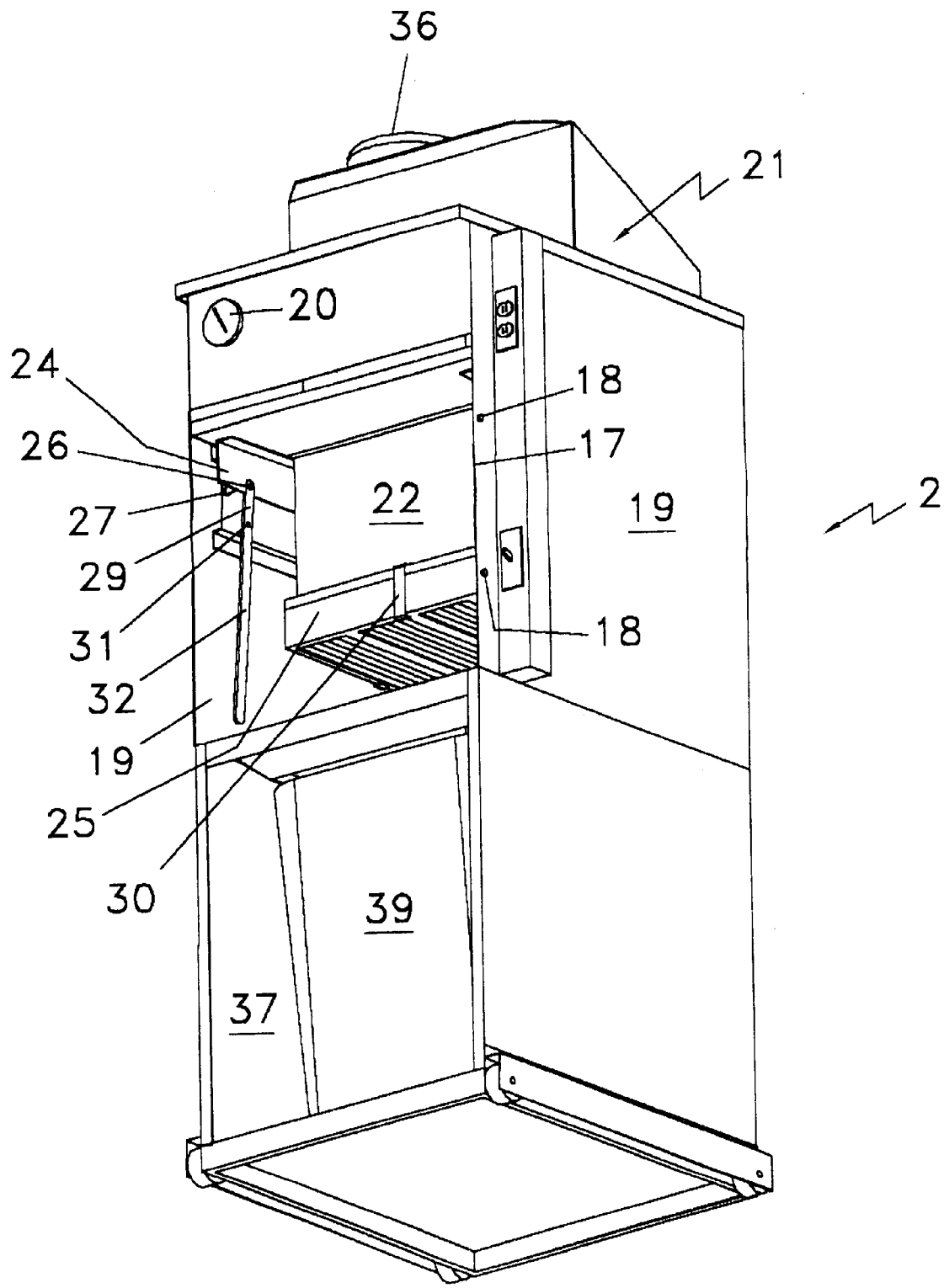
FIG. 3 is still another isometric front and side view taken from the same side as FIG. 1 of the structure of FIGS. 1 and 2 with the first work chamber of FIGS. 1 and 2 removed to allow access, insertion and positioning of filtration assemblies.
Figure 4:
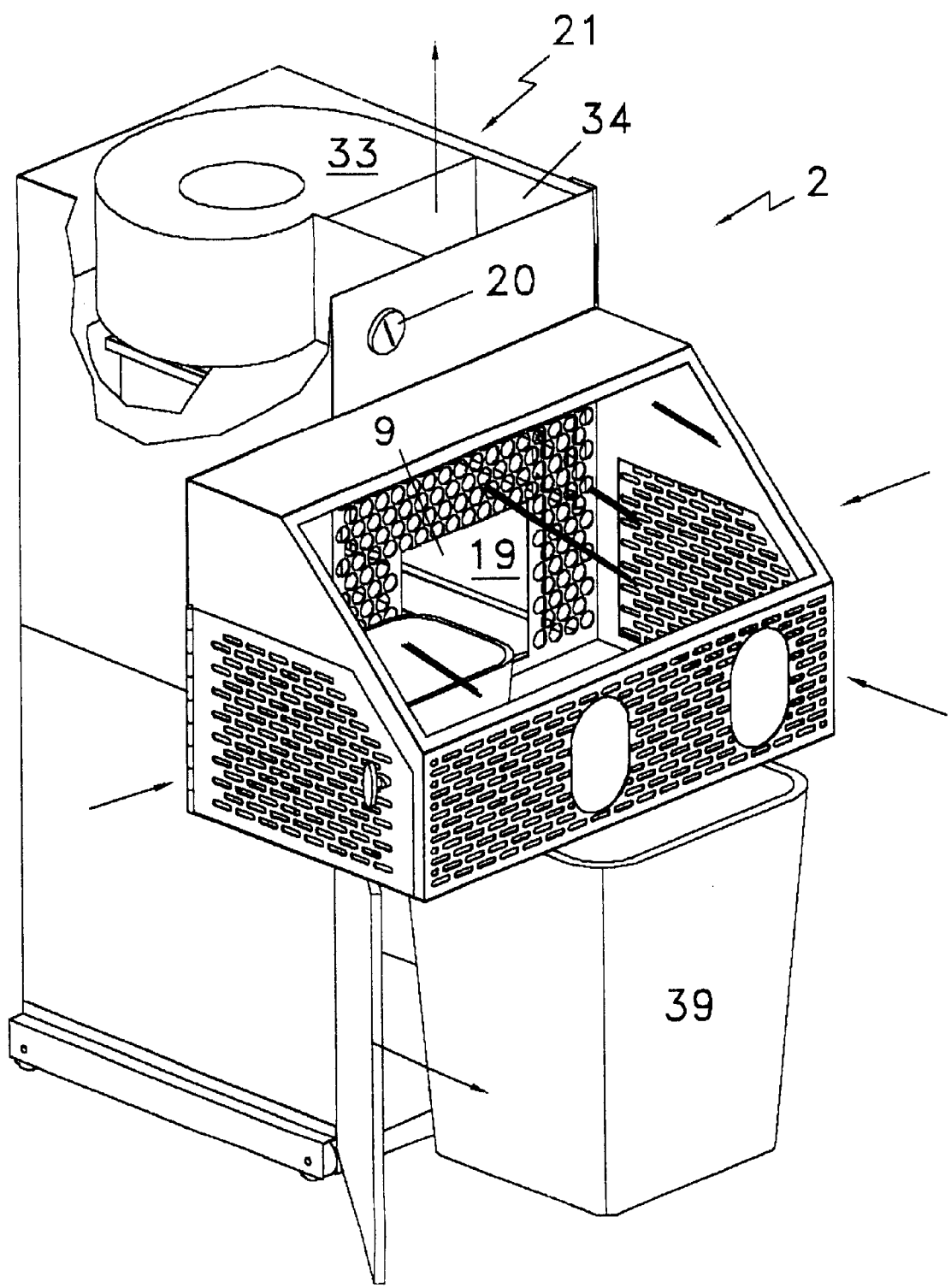
FIG. 4 is still another broken away overall front and side isometric view similar to FIG. 2, disclosing a portion of the air moving blower structure and the arrangement for insertion of the detritus material bag-carrying basket.
Figure 5:
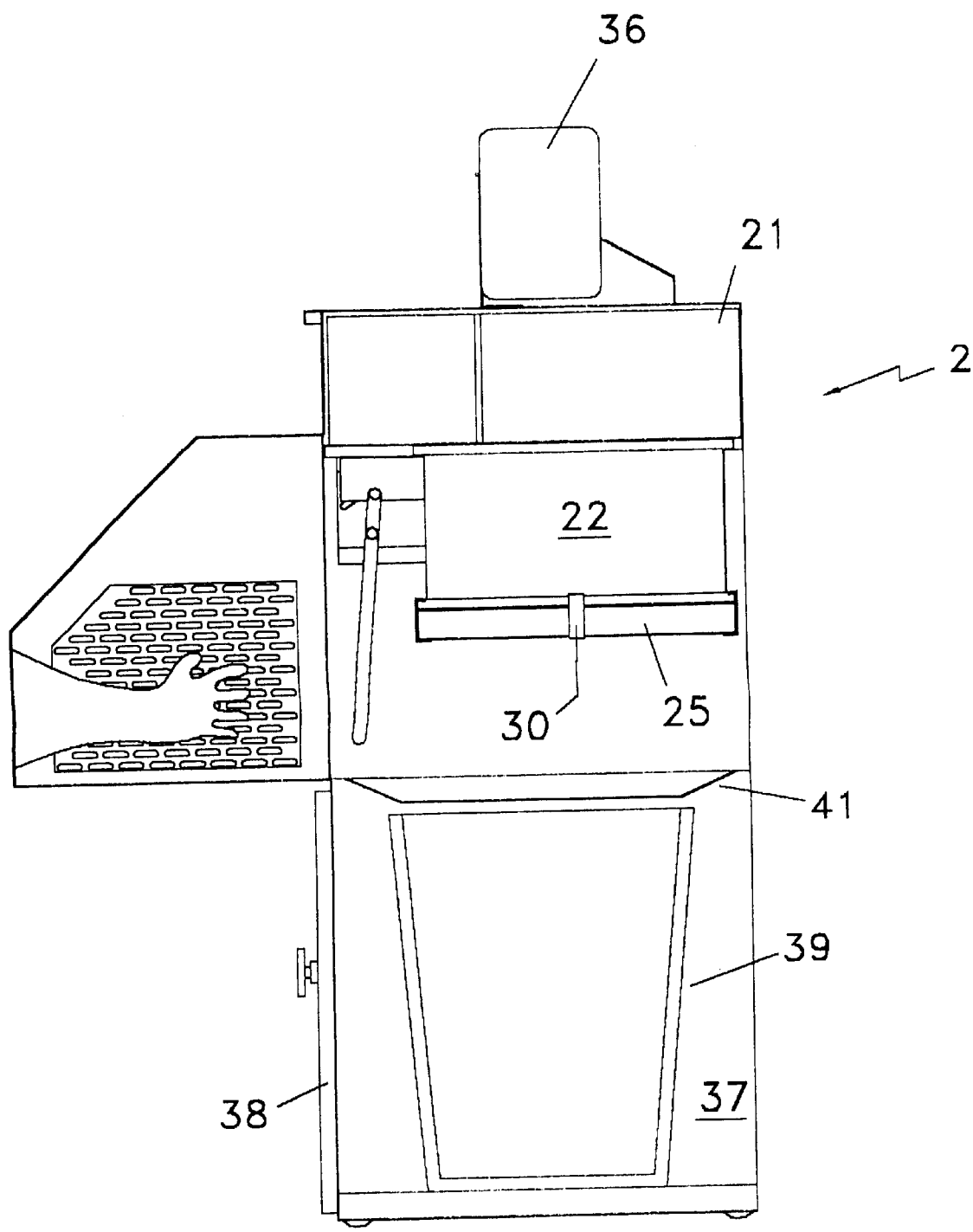
FIG. 5 is a partially broken away side view through 5—5 of FIG. 1 of the structure of FIGS. 1–4 disclosing the positioning of the filtration assembly and the detritus material carrying basket; and, FIGS. 6–9 are enlarged details of FIG. 8, the filtration assembly structure of FIGS. 1–5, including a broken side view (FIG. 6) of a portion of the enlarged structure in "open" position, a front view (FIG. 7) of a portion of the structure of FIG. 6, a similar side view (FIG. 8) to the structure of FIG. 6 in "closed" position; and, an enlarged view (FIG. 9) of a portion of FIG. 8 taken at line 9—9 of FIG. 8, disclosing the details of the sealing arrangement for the HEPA filter.
Figures 6, 9:
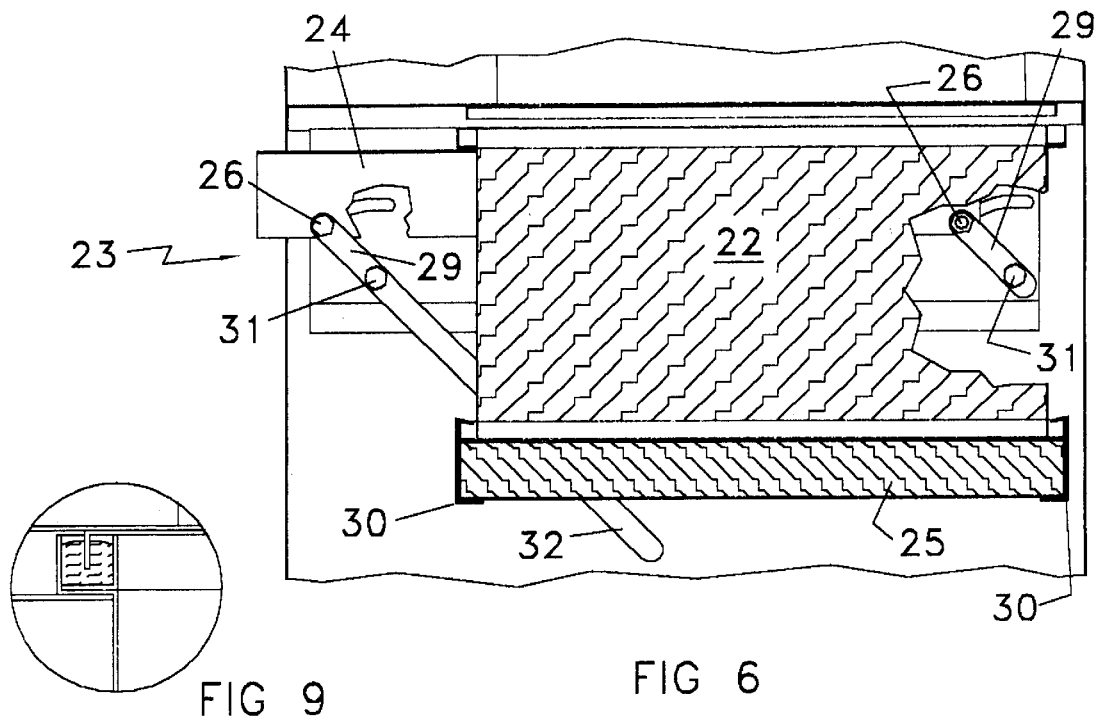
Figures 7, 8:
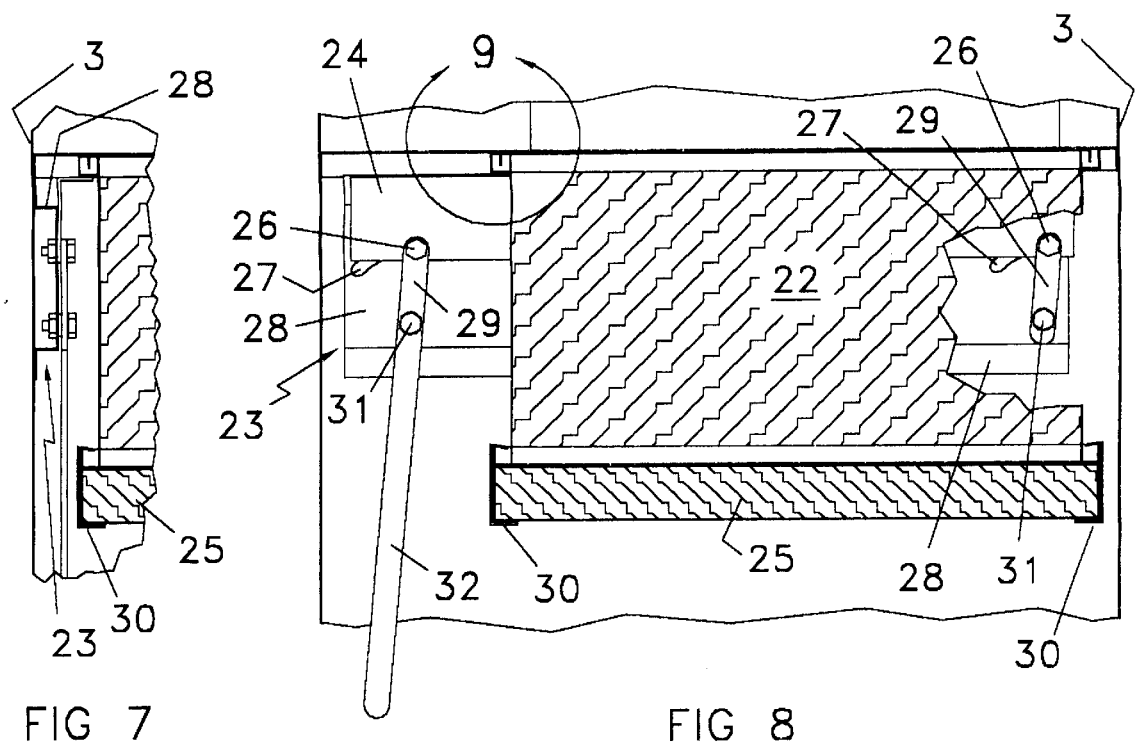

As can be seen in the overall isometric views of FIGS. 1–4, and side view of FIG. 5, the inventive contaminant freeing work structure 2 is shown as including a four walled, substantially rectangular, vertically extending cabinet 3 mounted on wheels 5 and having a longitudinally extending first work chamber unit 4 of trapezoidal cross-section removably cantilevered from the front wall thereof.

The frame work of cabinet 3 and removable work chamber unit 4 which can be removably suspended in cantilever fashion from cabinet 3 can be formed from a suitably light, sturdy material such as aluminum with work chamber unit 4 including a plurality of spaced, longitudinally extending slots 6 extending along the front and side walls of work chamber unit 4. The slots 6, as shown, can each have an appropriate measurement of two (2) by one half (0.5) inches (") and are positioned horizontally to provide a laminar type air flow—as discussed hereinafter—within work chamber unit 4. The front wall of work chamber 4—which chamber is of semi-trapezoidal cross-section—is provided with a pair of spaced port holes 7 with collars to which are attached the inlet end extremities of a pair of flexible, fluid impervious, manipulating gloves 8, which are appropriately sized to extend fully within the work space area provided by the removable first work chamber unit 4, and to allow communication with detritus or debris opening 9 in the rear wall of the work chamber 4. The upper slanting portion of the front wall of cantilevered removable work chamber 4 is provided with a suitably transparent, longitudinally extending, rectangularly shaped viewing surface 11 which can be formed from a suitable, visibly transparent material such as polycarbonate with the edges thereof sized and treated to be attached along the front wall of chamber 4.

Figure 2:
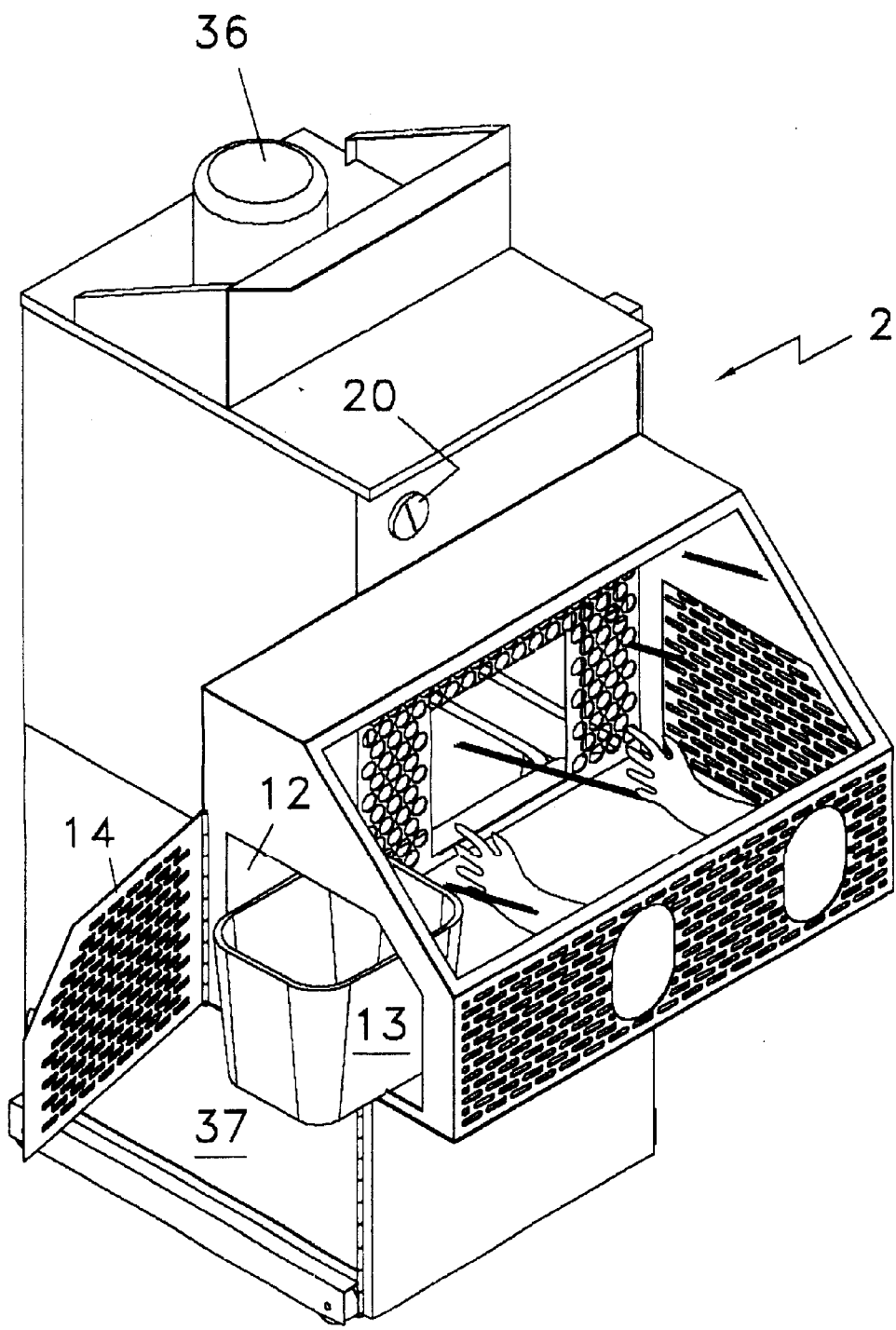
FIG. 2 is another isometric overall front and side view from the other side of the structure of FIG. 1, disclosing a latched access door in open position, allowing insertion and/or removal of a postal mail tote box.

It is to be particularly noted in FIG. 2 of the drawings that chamber 4 is provided with opposed side openings 12 (only one opening being seen in FIG. 2) of sufficient breadth and height to allow insertion and removal of a letter and parcel carrying box, such as a U.S. postal tote box 13, into the area of work chamber 4 to rest on the floor thereof. It also is to be noted that each of the side walls having an opening 12 is provided with a slotted hinged door 14 cooperative with its respective opening 12. Advantageously, the work chamber area can be appropriately sized to be equivalent to an area of at least twenty-four (24) by forty-two (42) by thirty-four (34) inches (") to accommodate such postal tote box.

Figure 1:
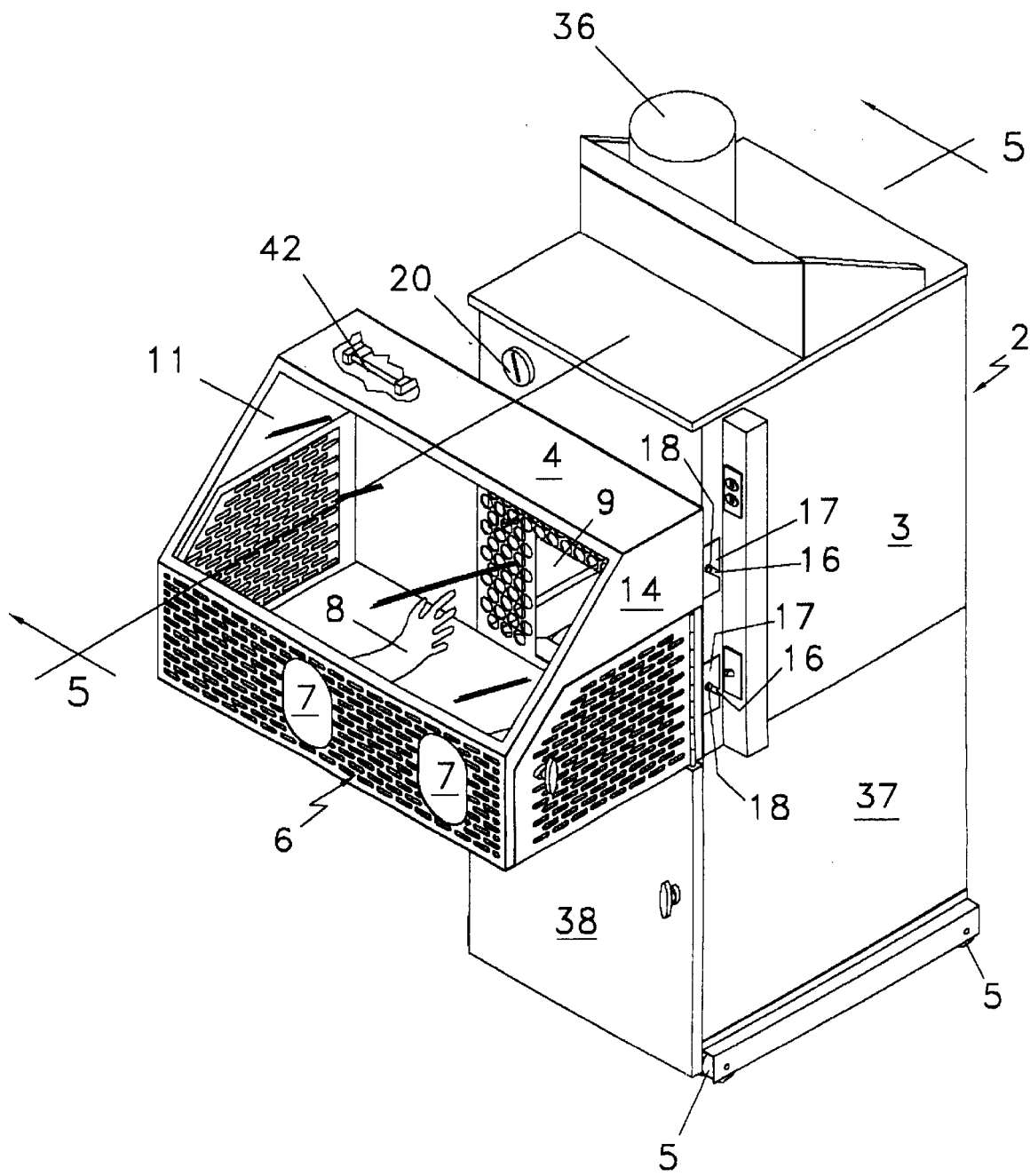
FIG. 1 is an isometric overall front and side view of the unique and novel contaminant freeing work structure positioned in ambient space surroundings.

As can be seen in FIG. 1 of the drawings, the rear wall of removable work chamber unit 4 has pairs of spaced slotted hinges 16 extending along the rear edges 17. These slotted hinges 16 matingly engage with aligned spaced support pin pairs 18 mounted along opposed edges of opposed walls of cabinet 3 to help support work chamber 4 in cantilever fashion therefrom. It is to be understood that the opposite wall edge of cabinet 3 can be provided with appropriately aligned similar pairs of spaced support pins 18 to receive like mating slots of hinges 16 on the opposite rear wall of cabinet 4 (not shown). In this regard, it also is to be understood that two or more spaced pairs of support pins 18 can be provided along each edge of the opposite walls of cabinet 4 to allow for elevational adjustment of work chamber 4 in accordance with a particular users height. It also is to be understood that appropriate elevational screw-type or slide mechanism connections could be utilized (not shown) to allow for incremental user height adjustments.

Referring to FIGS. 3 to 5, it can be seen that the upper portion of cabinet 3 is provided with an intermediate second chamber 19 and an upper third chamber 21. Intermediate second chamber 19, serves to receive at least one high efficiency filter 22, which advantageously can be of the well known HEPA type filter, rated to capture at least ninety-nine and ninety-seven hundreds (99.97) percent (%) of all particles, three tenths (0.3) microns in size and larger and to capture ninety-nine and nine hundred ninety-nine thousandths (99.999) percent (%) of all particles down to one (1) micron in size. As is shown in the drawings, the HEPA filter 22 can be preceded by an appropriate particulate removing, extended surface pleated filter 25, such as the Perfect Pleat™, produced by AAF International and covered by U.S. Pat. No. 6,254,653, issued to Kyung-Ju Choi on Jul. 3, 2001, which is of self-supporting pleated media and is constructed of a heavy duty frame. Filter 25 can be clipped to HEPA filter 22 by suitable clips 30 (FIGS. 3, 5 and 6 through 9).

Referring particularly to FIGS. 6–9 of the drawings, details of one side wall filter support arrangement device 23 in second chamber 19 of cabinet 3 can be seen. Moveably mounted on opposite side wall of second chamber 19 in cabinet 3 are a pair of spaced opposed movable rails 24 (only one such rail of the opposed pair being shown in FIGS. 6–8, with a small portion of the oppositely spaced other cooperating rail being visible in FIG. 3. Each support rail 24 is provided with a pair of spaced guide pins 26, each of which engages in one of a spaced pair of corresponding arced support slots 27 located in a horizontally extending support member 28 which is fastened to one of the opposed side walls of cabinet 3. A pair of spaced links 29 are each fastened to an upper end to one of spaced pins 26 and pivotally fastened at a lower end by pins 31 to horizontal support beam 28, which, in turn, as previously described, is fastened to a side wall of the pair of spaced opposed side walls of cabinet 3. Suitable actuating lever arms 32 extend from each spaced opposed links 29 adjacent the front end of cabinet 3. Accordingly, with movable cantilevering work chamber unit 4 removed from the open front wall of cabinet 3, a HEPA filter 22 may be positioned on the pair of spaced opposed rails 24 (along with a clipped on prefilter 25 (FIGS. 5 through 8). Spaced opposed actuating lever arms 32 are then pivotally moved forward so that the spaced front and rear guide pins 26 follow camming arced slots 27 to upwardly move spaced opposed rails 24 upon which HEPA filter 22 is mounted so as to be in sealing relation with a bottom panel of third chamber 21 (FIG. 9) with a knife edge seal penetrating into a gel filled trough forming path along the HEPA filter face to prevent air stream bypass as is known in the art.

Third chamber 21 (FIGS. 4 and 5) serves as a downstream, air moving chamber to include an electrically powered centrifugal blower 33 and motor 36, communicably connected to an outlet 34. Blower 33 and motor 36 can be a one hundred twenty (120) volt, fifteen amp centrifugal blower and motor, capable of providing a lower than ambient pressure in chamber 4 upstream thereof, moving the air stream through slots 6 in an approximate range of one hundred (100) to three hundred (300) feet per minute (fpm) with pressure chamber 4 being maintained below ambient pressure. A suitable differential pressure gage 20 can be provided to determine pressure differential across filters 22 and 25 and work chamber unit 4 so as to be below ambient pressure.

Referring to FIGS. 1 and 3–5, it can be seen that the lower portion of cabinet 3 provides a lower detritus receiving fourth chamber 37 with the front end of chamber 37, namely the lower front wall of cabinet 3 including a hinged door 38. With door 38 in open position, a detritus waste basket 39 can be inserted or removed from such fourth lower chamber 37. Basket 39 can be appropriately provided with replaceable, disposable, flexible, sealable bag liners which, when opened, serve to receive detritus materials passed from chamber 4 through detritus opening 9 and an aligned cooperative detritus guide chute 41.

Finally, it further is to be understood that a suitable fluorescent lights 42 can be mounted in work chamber unit 4 to allow clear, "cool light" vision without thermal disruption during work operations.

In a typical operation of the above described unique and novel shelter apparatus, with the work chamber unit 4 having been removably positioned in cantilever fashion on cabinet 3 after at least an appropriate HEPA filter 22 (and, if desired, a prefilter) has been inserted and sealed in second chamber 19 and a basket 39 carrying a sealable bag has been inserted in the fourth chamber 37 with the bag opening positioned below chute 41, electrically driven blower 33 can be started by pressing start button 43 mounted on cabinet 3. It is to be understood that, if chamber 4 includes a "cool fluorescent" light 42, this also is turned to "on" position. Centrifugal blower 33 maintains an upstream pressure below ambient (as described above) and ambient air is moved in a laminar flow stream through slots 6 of upstream chamber 4 and intermediate second chamber 19, through a prefilter (if used) and HEPA filter 22, through actuated blower 33 and outlet 34 into ambient. With blower 33 running and, again, with laminar air flow stream passing through upstream cabinet chambers described, tote box 13—or some other suitable article to be worked upon—is inserted through hinged door 14 into work chamber unit 4. If a mail tote box 13 has been inserted, the mail is removed indirectly by a worker located in ambient surroundings, utilizing port holes 7 and sealed flexible gloves 8. Each mail envelope or package, as the case may be when removed from the tote box, is slit open, and sorted with the detritus material, such as opened envelopes and opened boxes being passed through detritus opening 9 down chute 41 and into an opened, sealable and removal bag disposed in basket 39. The blower 33 is maintained in an "on" position until it has been ascertained by suitable instrumentation that substantially all particulate matter has been captured by prefilter 25 and HEPA filter 22 with blower 33 still in "on" position, the emptied tote box 13 and the detritus basket 39 with sealed bag therein are removed and replaced. As a further safety matter, blower 33 can be maintained in "on" position indefinitely for further use.

The invention claimed is:

1. A contaminant freeing work structure positionable in ambient surroundings comprising: a first chamber providing a work station therein sized to support and accommodate a work object to be handled by a worker positioned in said ambient surroundings, said first chamber including a cover wall with a portion thereof being translucent and a portion there being movably attached to said cover wall to allow introduction of said work object into said work station chamber and to be subsequently closed therearound to be visible to said worker positioned in said ambient surroundings, said first chamber further including ambient air inlets to allow ambient air to pass therethrough and working port means having flexible glove means sealingly attached thereto to extend into said first chamber to permit said worker to handle said work object indirectly in sealed relation therefrom; a second chamber communicably connected to said first chamber downstream thereof, said second chamber having a flow-through particulate filter removably disposed therein; and, a third chamber connected to said second chamber, said third chamber including a blower and a clean air outlet connected to ambient surroundings for moving air through said first and second chambers maintaining said upstream chamber pressures below ambient pressure, filtering air as it passes through said particulate filter in said second chamber to said clean air outlet in said third chamber.

2. The contaminant freeing work structure of claim 1, and a fourth chamber communicating with at least said first chamber and being sized to accommodate a removable container to receive detritus material.

3. The contaminant freeing work structure of claim 1, said ambient air inlets being in the form of selectively spaced slots in said first chamber cover wall to provide a laminar sweeping air flow pattern over the surface of said work station and work object positioned therein.

4. The contaminant freeing work structure of claim 3, said selectively spaced slots, each having an approximate measurement of two (2) by one half (0.5) inches (") with the slots being selectively spaced from each other with the lengths thereof extending in selected positions so as to provide an air stream passing therethrough of substantially laminar, sweeping flow characteristics in said work station and around the work object positioned therein.

5. The contaminant freeing work structure of claim 1, said first chamber measuring approximately twenty-four (24) by forty-two (42) by thirty four (34) inches to provide a work station capable of accommodating a typical mail tote box carrying postal mail to be opened and sorted.

6. The contaminant freeing working structure of claim 1, said first chamber being removably connected to said second chamber to allow ready access to said second chamber.

7. The contaminant freeing work structure of claim 1, said working port means in said first chamber including two spaced glove ports with collars to which are attached a pair of flexible fluid impervious, reusable gloves to allow an ambient positioned worker to handle work objects in said first chamber without being in direct contact therewith.

8. The contaminant freeing work structure of claim 1, said first chamber including fluorescent lighting means to provide a "cool" light source without thermal disruption of the laminar air flow pattern through said first chamber.

9. The contaminant freeing work structure of claim 1, said flow-through particulate filter in said second chamber being a high efficiency particulate air filter (HEPA), having ninety-nine and ninety-seven hundredths (99.97) percent (%) efficiency on particulates of three tenths (0.3) microns, said filter being sealed into said second chamber with a knife edge seal penetrating into a gel filled trough forming part of said filter face which prevents air stream by pass.

10. The contaminant freeing work structure of claim 9, said second chamber having a pair of spaced supporting rails extending adjacent to and downstream said first chamber to receive said filter and two, spaced, level actuating sealing members pivotally positioned in said second chamber in alignment with said rails to seal said filter in said second chamber.

11. The contaminant freeing work structure of claim 1, and flow-through prefilter means positioned downstream said first chamber to prevent large work object materials entering into said particulate filter in said second chamber.

12. The contaminant freeing work structure of claim 1, said blower comprising a direct drive centrifugal blower capable of providing a lower than ambient pressure in said first chambers upstream thereof, moving said air stream in laminar, air stream flow through said first and second chambers in an approximate range of one hundred (100) to three hundred (300) feet per minute (fpm) with a pressure in chambers upstream of said blower to be below ambient pressure.

13. The contaminant freeing work structure of claim 2, said detritus receiving fourth chamber being positioned below said first chamber and including a moveable panel to accommodate a replaceable bag liner for disposal of said detritus materials.

14. A contaminant freeing work structure positionable in ambient surroundings comprising: an aluminum and polycarbonate cabin et structure having a walled upstream first chamber; wall ed aligned downstream second and third chambers an d a walled fourth chamber positioned below said first chamber; said first chamber being removably connected to said second chamber, said first chamber measuring approximately twenty-four (24) by forty-two (42) by thirty inches to provide a work chamber capable of accommodating a work object such as a typical mail tote box carrying postal mail to be opened and sorted, said first chamber providing a horizontally extending work surface in the lower part thereof and including a moveable panel to allow introduction of said work object and placement thereof on said work surface, at least a portion of said first chamber being in communication with said fourth chamber therebelow to receive detritus material from said work object, said first chamber further including a polycarbonate viewing window to allow a worker positioned in ambient surroundings outside said first chamber to view said work object for appropriate manipulation, said first chamber including two spaced glove ports having collars to which are attached a pair of flexible, chemically resistant, fluid impervious permanent one piece gloves to allow a worker to handle work objects on said work surface without being in direct contact therewith, said first chamber including a fluorescent light panels to provide a "cool" light source without thermal disruption of a laminar air flow pattern through said chamber, said laminar air flow pattern being ambient air introducible into said first chamber through selectively spaced ambient air inlet slots in said first chamber wall, said selectively spaced slots each having an approximate measure of two (2) by one half (0.5) inches with the wall slots being selectively spaced from each other with the lengths thereof extending in selective positions through said wall to allow an ambient air stream passing therethrough to be of substantially laminar, sweeping characteristics over said work surface and work object positioned therein; said second chamber including a flow-through high efficiency particulate air filter (HEPA) having ninety-nine and ninety-seven hundredths (99.97) percent (%) efficiency on particles of three tenths (0.3) microns, said filter being sealed into said second chamber with a knife edge seal penetrating into a gel filled trough forming path along said HEPA filter face to prevent air stream bypass, said second chamber having a pair of spaced supporting rails to receive said filter through said first chamber and two spaced lever actuating sealing members pivotally positioned in said second chamber in alignment with said rails to seal said filter in said second chamber; a flow-through prefilter downstream said first chamber to prevent larger work object detritus material entering into said particulate filter in said second chamber; said third chamber having mounted therein a direct drive one hundred twenty (120) volt fifteen (15) amp fan capable of providing a lower than ambient pressure upstream thereof in at least said first and second chambers to move an ambient air stream through said slots in said first chamber wall in laminar flow over said work object, advantageously at approximately two hundred (200) feet per minute (fpm) with a negative pressure in said first and second chambers upstream of said third chamber to be below ambient; said detritus receiving fourth chamber positioned below and in communication with said first chamber, said fourth chamber including a moveable panel to accommodate replaceable bag liners for detritus disposal.

15. A method of treating a work supported object within ambient surroundings having sufficient space to accommodate at least one worker comprising: introducing said work object into a first enclosed, slotted work supporting zone positioned in said ambient surroundings, said first slotted work supporting zone including means for an isolated worker to view and manipulate said work supported object in said first zone without direct contact and being connected to an enclosed, aligned second filtration zone and to an enclosed, aligned third air moving zone; and, actuating said air moving zone to draw ambient air though said connected first, second and third zones with at least said first and second zones having air pressure below ambient surroundings.

16. The method of treating a work supported object of claim 15, wherein detritus material is passed from said first enclosed, slotted work supporting zone to a connected detritus collecting fourth zone.

17. The method of treating a work supported object of claim 15, wherein ambient air is introduced into said first enclosed, slotted work supporting zone in a laminar sweeping air flow pattern.

18. The method of treating a work supported object of claim 14, wherein said first enclosed, slotted work supporting zone is fluorescently lighted.

19. The method of treating a work supported object of claim 14, wherein said ambient air is passed through a prefilter zone downstream said first enclosed slotted work supporting zone to capture large detritus matter.

20. The method of treating a work supporting object of claim 14, wherein filtration in said second filtration zone is accomplished through a sealed high efficiency particulate air filter (HEPA).

21. A method of treating a work supported object within ambient surroundings having sufficient space to accommodate at least one worker comprising: introducing said work object into a first enclosed, slotted work supporting zone positioned in said ambient surroundings, said first slotted work supporting zone including means for an isolated worker positioned in an ambient area to view and manipulate said work supported object in said first zone with ambient air passing into said zone in a sweeping laminar fashion to maintain the air pressure in said first zone below surrounding ambient area air pressure, said first zone being fluorescently lighted during laminar air flow operations, said first enclosed zone being connected to an aligned second filtering zone and a third aligned power blower zone with a fourth detritus recovering zone positioned below and in communication with said first zone to receive waste detritus therefrom including large particulate matter trapped by prefilter means positioned downstream said first zone; said second zone including a high efficiency particulate air filter (HEPA).

* * * * *